United States Patent Office 3,301,058
Patented Jan. 31, 1967

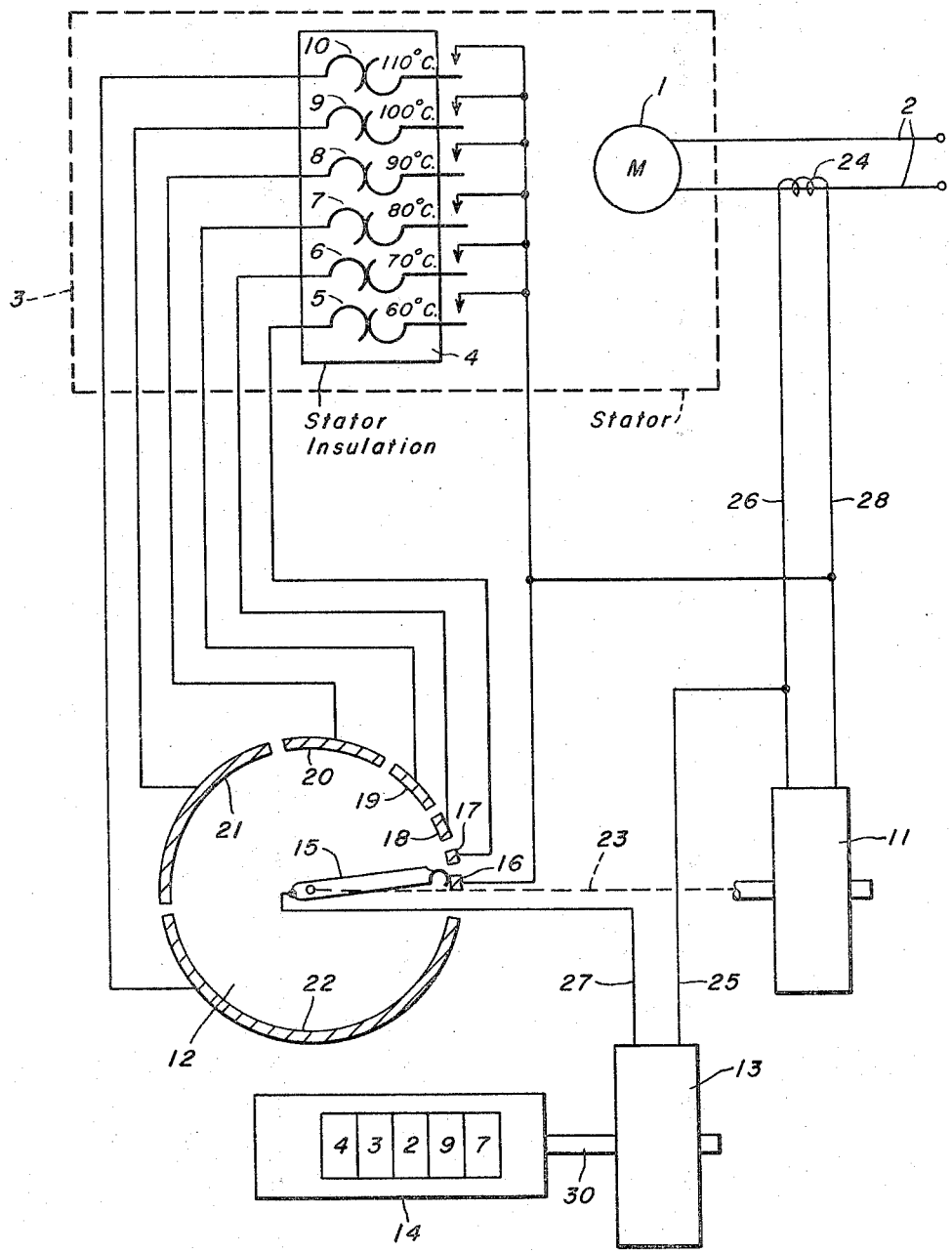

3,301,058
TIME-TEMPERATURE AGE REGISTER FOR
ELECTRICAL INSULATION
William L. Roberts, Murrysville, Pa., assignor to United
States Steel Corporation, a corporation of Delaware
Filed Oct. 2, 1963, Ser. No. 313,297
5 Claims. (Cl. 73—339)

This invention relates to an apparatus for registering the operational age of electrical equipment as a function of its time of operation and the temperature of its electrical insulation during such operation. Such apparatus, more particularly, is designed to furnish an indication of the unexpended life of electrical equipment such as, for example, large electrical drive motors used in steel mill operations. For this purpose the apparatus of this invention, in a manner to be described, measures the expended useful life of the insulation by monitoring the running time of a motor and the temperature of its windings.

The life of electrical motors and other electrical equipment is to a large extent determined by the life expectancy of its electrical insulation, which varies with the temperature under which it is operated. According to a well established rule, the life expectancy of insulation in electrical motors and the like is halved for every 10° C. rise in temperature over the normal operating temperature at which the equipment was designed to be operated. For example, a motor designed to operate under normal conditions at 50° C. and having a life expectancy of 100,000 hours when operated at such temperature will have its life expectancy cut to 50,000 hours if its insulation is subjected continuously to a temperature of 60° C. and to 25,000 hours if operated at 70° C., etc. From this it follows that the expended life or operational aging of electrical equipment is determined by both its time of operation and the temperature of its electrical insulation. One of the objects of this invention is to provide an apparatus that will register the age of electrical equipment in accordance with both of these conditions.

Other objects and advantages of the invention will become apparent from the following description and the drawings in which the single figure is a diagrammatic illustration of a registering apparatus which is constructed in accordance with the principles of this invention and shows the manner in which it is applied to register the expended life of insulation in electrical equipment.

As indicated above and shown in the drawings by way of example, the apparatus of this invention is particularly designed for registering the life of electrical apparatus such as an A.C. motor 1 which is connected to a source of electrical power by a pair of conductors 2. In this showing the broken lines 3 designate diagrammatically the stator of the motor 1 and the block 4 designates a fragmentary portion of the insulation about the motor stator windings. The registering apparatus of this invention, generally stated, comprises a plurality of thermostats 5–10 embedded in the insulation 4, a synchronous A.C. clock-motor drive 11 that is operated in response to operation of the motor 1, a rotary control switch 12 operated by the drive 11, a second synchronous A.C. clock-motor drive 13 the operation of which is under the control of switch 12, and a register counter 14 that is driven by the clock-motor drive 13. The thermostats 5–10 are ambient temperature operated devices or relays that are normally open and are set by adjustment to close when the insulation 4 reaches the respective temperatures indicated on the drawing.

The rotary switch 12 comprises a rotatable contactor 15 and a plurality of arcuately-shaped stationary contacts 16–22 that have different angular lengths for a purpose to be described and are arranged in circumferentially spaced positions about the center of the switch 12. The contacts 16–22 are engaged by the contactor 15 during rotation thereof to complete energizing control circuits for the motor 13. A drive shaft 23 connects the contactor 15 with the switch motor 11, which is energized through a current transformer 24 in response to energization of the conductors 2 so that the contactor 15 is rotated by the motor 11 only when the motor 1 is operating. The energizing circuits for the register motor 13 that are completed through the arcuate contacts 16–22 comprise a conductor 25 that is permanently connected to a conductor 26 at one side of the transformer 24 and a conductor 27 that is connected to a conductor 28 at the other side of the transformer 24 through the rotatable contactor 15 and successive ones of the arcuate contacts 16–22. For this purpose, the arcuate contact 16 has a permanent connection with the transformer conductor 28 and the remaining contacts 17–22 are connected with the conductor through the temperature responsive relays 5–10. By reason of this arrangement, the motor 13 is energized to effect operation of the register counter 14 only during those time intervals when the conductors 26 and 28 are energized by the transformer 24 and when the rotating contactor 15 is engaged with one of the arcuate contacts 16–22 that is in closed circuit either directly or through one of the thermostats 5–10 with the transformer conductor 28.

Since the arcuate contact 16 is permanently connected with the conductor 28, it will be apparent that the drive motor 13 will be energized during each revolution of the contactor 15 for a period of time corresponding to the arcuate length of the contact 16. Assuming that operating conditions are normal and that the temperature of the insulation 4 remains below 60° C. at which the thermal relay or thermostat 5 closes, then the counter 4 will register the time of operation of the motor 1 in units of time such as hours.

If the temperature of the stator insulation 4 exceeds 60° C., but is less than 70° C., then the thermostat 5 will close to complete a circuit from the arcuate contact 17 to the transformer conductor 28, and the register counter drive motor 13 will thus be operated during the period in which the rotating contactor 15 has engagement with the contact 17. Since the arcuate lengths of the contacts 16 and 17 are equal, it will be apparent under these conditions that the time intervals during which the clock-motor drive 13 is energized and the rate of operation of the counter 14 will be doubled compared to that which is had when the temperature of the insulation is less than 60° C., and the counter 14 will thus register a reading of 100,000 in 50,000 hours of operation of the motor 1.

In like manner, the rate of operation of the counter 14 will be doubled again for each successive 10° C. rise in temperature. For example, if the temperature exceeds 70° C., the thermostat 6 closes to complete a circuit through the arcuate contact 18; at 80° C., the thermostat 7 closes to complete a circuit through the arcuate contact 19; at 90° C., the thermostat 8 closes to complete a circuit through the arcuate contact 20; at 100° C., the thermostat 9 closes to complete a circuit through the contact 21; and at 110° C., the thermostat 10 closes to complete a circuit through the contact 22. The arcuate contacts 16 and 17 have the same angular length as indicated above, and the respective lengths of the arcuate contacts 18 through 22 respectively have lengths that double the time of operation of the motor 13 at each 10° C. rise in the temperature of the insulation 4 and thus double the rate at which the units of operation are recorded on the counter 14. These conditions are met by providing a clock-motor drive 11 that rotates the shaft 23 and contactor 15 at an angular speed of 1 r.p.m., by constructing the rotary switch 12 with arcuate contacts 16 and 17 having an arcuate length of 5° each, and with arcuate contacts 18 through 22 respectively having arcuate lengths of 10°, 20°, 40°, 80°, and 160°; by providing a clock-motor drive 13 that rotates the shaft 30 connecting it to the counter 14 at a speed of 6/5 r.p.m.; and by providing a counter 14 that registers 1 unit of operation for each revolution of the shaft 30. If the temperature of the insulation 4 is less than 60° C., such apparatus in operation will cause the shaft 30 to be rotated 1 revolution during each hour to register 1 unit of operation on the counter 14, since the synchronous clock-motor drive 13 will be powered for only 5/360 hour during which the shaft 30 will be rotating at the angular speed of 6/5×60 or 360/5 revolutions per hour. At temperatures of over 60° C., the thermostat 5 will close to establish an energizing circuit through the contact 17 to double the time during which the clock-motor drive 13 is energized, so that the shaft 30 will be rotated 2 revolutions and the counter 14 will register 2 units during each hour of operation. At temperatures over 70° C., closure of the thermostat 6 and the 10° arcuate length of the contact 18 will again double the length of time during which the motor-drive 13 is energized so that 4 units will be registered on the counter 14 during each hour of operation. At each successive 10° C. rise in temperature of the insulation 4, the thermostats 7–10 in conjunction with the contacts 19–22 respectively become effective to double the period of operation of the shaft 30 and thus the units registered on the counter 14. When thermostat 7 closes at 80° C., shaft 30 turns 8 revolutions during each hour; when thermostat 8 closes at 90° C., shaft 30 turns at 16 revolutions in each hour. At 100° C., thermostat 9 closes and shaft 30 makes 32 revolutions each hour, and when the motor 1 reaches 110° C., closure of thermostat 9 causes shaft 30 to complete 64 revolutions each hour.

From the foregoing it will be apparent that the apparatus of this invention is effective to register the operational age of electrical equipment in a manner that is determined by the time the equipment is in operation and the temperature of its electrical insulation. It will also be apparent that the age registering apparatus of this invention provides a simple, electro-mechanical integrating system that will summate time or life expectancy in a manner dependent on temperature. Although for simplicity, such system describes in a step-wise manner due to the stepped temperature operation of the thermostats, it will be understood that a continuously operating system changing in response to small temperature variations could be devised and is contemplated. A continuous system, for example, may comprise a continuously variable temperature indicator coupled to a continuously variable oscillator, coupled in turn to an electronic counter.

While one embodiment of my invention has been shown and described it will be apparent that other adaptations and modifications may be made without departing from the scope of the following claims.

I claim:

1. Apparatus for registering the operational age of insulation in electrical equipment comprising a register, a clock-motor for driving said register, and means responsive to operation of said equipment and to the temperature of said insulation for controlling the operation of said clock-motor, said control means including means periodically effective when said insulation is at a normal temperature for rendering said clock-motor operative for intervals of time sufficient to drive said register to indicate the time of operation of said equipment, and when said insulation is at higher temperatures to render said clock-motor operative correspondingly greater intervals of time whereby said register is operated to indicate the increased aging of said insulation due to operation at higher temperatures.

2. Apparatus for registering the operational age of insulation in electrical equipment comprising a register, a clock-motor for driving said register, and means responsive to operation of said equipment and to the temperature of said insulation for controlling the operation of said clock-motor, said control means including means periodically effective when said insulation is at a normal temperature for rendering said clock-motor operative for intervals of time sufficient to drive said register to indicate the time of operation of said equipment, and means responsive to the temperature of said insulation for rendering said clock-motor operative correspondingly longer intervals of time at higher temperatures of said insulation whereby said register is operated to indicate the more rapid aging of said insulation due to its operation at higher temperatures.

3. Apparatus as defined in claim 2 characterized by said temperature responsive means comprising a plurality of thermal switches that operate successively at higher temperatures of said insulation and respectively render said clock-motor operative correspondingly greater intervals of time.

4. Apparatus for registering the operational age of insulation in electrical equipment such as motors and the like comprising a registering means, a synchronous A.C. clock-motor drive for operating said registering means, and means controlling the operation of said drive comprising a rotary switch having a plurality of circumferentially spaced arcuate contacts, a synchronous A.C. clock-motor for operating said switch at the rate of 1 revolution per unit of time, means responsive to the operation of said electrical equipment for operating said switch clock-motor, and a plurality of control circuits respectively adapted to be completed through said arcuate contacts and effective when completed for rendering said clock-motor drive for said registering means operative for different intervals of time during each revolution of said rotary switch, one of said circuits being rendered operative during each revolution of said switch for an interval of time sufficient to cause said registering means to register the units of time said equipment is in operation, the remainder of said circuits being temperature responsive circuits and respectively including thermal switches that operate in response to the temperature of said insulator at successively high temperatures above the normal operating temperature of said insulation, said arcuate contacts in said remaining circuits having lengths such that said remaining circuits operate when completed by closure of said thermal switches to cause said registering means to register an additional number of said units corresponding to the accelerated aging of said insulation due to operation at temperatures above its normal operating temperature.

5. In apparatus for registering the operational age of insulation in electrical equipment of the type including a register and a clock-motor drive for operating said register, the combination therewith of means responsive to the operation of said equipment and the temperature of said insulation for periodically actuating said clock-motor drive for time intervals of a length corresponding to the temperature of said insulation comprising a rotary switch having a plurality of circumferentially spaced arcuate contacts respectively having angular lengths related to the operating temperatures of said insulation, means for operating said switch at a constant angular speed, and means including a plurality of thermal switches respectively operating at different temperatures of said insulation and connected with selected ones of said arcuate contacts to establish control circuits for actuating said clock-motor drive for time intervals corresponding to the temperature of said insulation.

References Cited by the Examiner

UNITED STATES PATENTS

| | | | |
|---|---|---|---|
| 2,505,521 | 4/1950 | Boyajian | 73—350 X |
| 2,758,475 | 8/1956 | Cotton | 73—339 |
| 2,841,982 | 7/1958 | Johnson | 73—339 |
| 2,912,163 | 11/1959 | Van Tuyl | 73—343.5 X |
| 2,972,253 | 2/1961 | Benson | 73—350 |

LOUIS R. PRINCE, *Primary Examiner.*

S. H. BAZERMAN, *Assistant Examiner.*